Patented Dec. 19, 1933

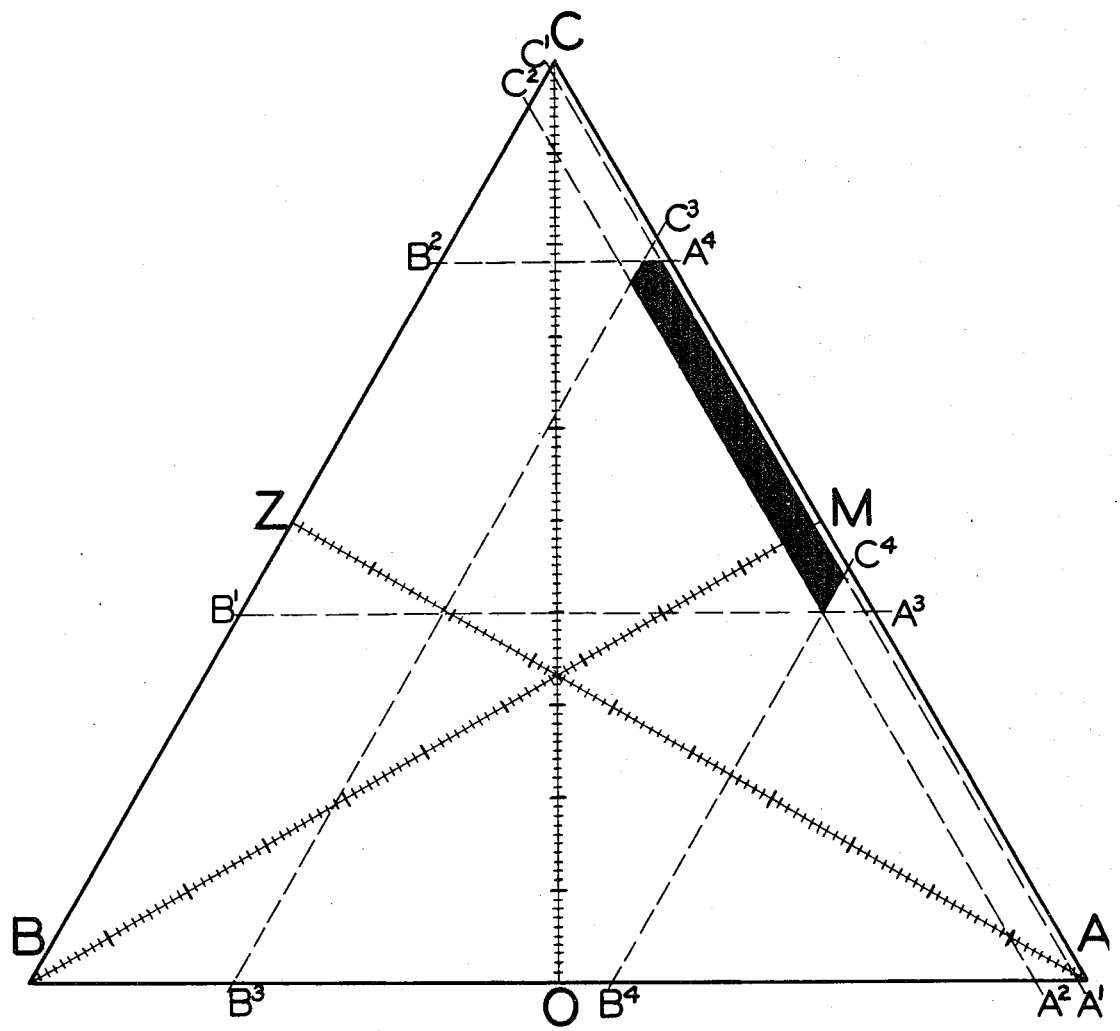

UNITED STATES PATENT OFFICE 1,940,398

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri Application January 21, 1933. Serial No. 652,948

26 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "Cut Oil", "Roily Oil", "Emulsified Oil", and "Bottom Settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results and sometimes with inferior results. Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class, with another known demulsifier selected from a different class, can easily be determined by simple routine chemical experimentation involving only chemical skill or knowledge, as distinguished from inventive ability. There have been instances where particular petroleum emulsions or particular types of emulsion would not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent or demulsifying agent contemplated by our process is of the kind that is composed of a mixture of materials, but it is also that particular type of mixture which is characterized by great specificity, both in the substances of which it is composed, and in the quantities or proportions of said substances. It consists of a free flowing mixture of oil-soluble petroleum sulfonic acid salt and modified acid bodies free from or relatively low in combined sulfur trioxide, plus an oil-soluble (hydrophobe) solvent, such as kerosene, cresylic acid, tetralin, or solvent naphtha, plus an oil-insoluble (hydrophile) solvent, such as water, plus approximately 1 to 5% of inorganic mineral acid salts.

One peculiarity of our improved demulsifying agent is that it is used most advantageously without dilution, and particularly, without dilution with water. It is water-soluble or water-miscible, but in the majority of cases, it is not profitable to use it in the form of an aqueous solution, dispersion or suspension. Likewise, it is miscible with oil, such as kerosene or crude oil and can be diluted with one or two volumes of kerosene or crude oil before use. Dilution with an oily vehicle is not nearly as objectionable as admixture with water, and such mixtures with oil may be employed if desired, especially in adding a small quantity of reagent to a large quantity of cut oil. In using our improved demulsifying agent we prefer to add it directly to the petroleum emulsion being treated without first diluting the demulsifying agent, and when using it in this way, it is essential that the demulsifying agent be of sufficiently low viscosity to be free-flowing, so that it can be mechanically added to the emulsion by means of a suitable pump, lubricator or the like. Furthermore, we have found that if the mixture constituting our improved demulsifying agent is not free-flowing, i. e., if it is quite viscous, the dissolved inorganic salts in same do not have any beneficial effect, and thus the full benefit of the combination of substances constituting the mixture is not realized. Thus, high viscosity is objectionable from the standpoint of co-operative action of the individual components, as well as being troublesome in the mechanical application of the reagent to the cut oil.

Our improved demulsifying agent has some of the attributes or characteristics of demulsifying agents disclosed by the prior art, but it is of specifically different composition and has different physical characteristics and different chemical composition from the treating agents or demulsifying agents heretofore used in the resolution of petroleum emulsions of the water-in-oil type. Furthermore, these differences are not of arbitrary differentiation, but actually result in a composition of matter which is especially effective in actual daily use on a large amount of cut oil. For example, while it contains modified fatty acids, as disclosed in U. S. Patent No. 1,467,831, to William S. Barnickel, dated September 11, 1923, yet it contains or comprises a particular class of modified fatty acids, to wit, modified fatty acids in the form of an acid, or salt, or ester, or mixture of the foregoing which are characterized by a low combined sulfur trioxide content, or even the complete absence of combined sulfur trioxide. It has the same physical properties as the demulsifying agent disclosed in U. S. Patent No. 1,454,616, to Ayres, dated May 8, 1923, that is, oil-miscibility, and a tendency to produce an oil-in-water emulsion when dissolved in or added to water, and yet, it is different in composition from the reagent disclosed by Ayres and also possesses other additional desirable characteristics; it possesses the property of separating out of oil when the solution in oil is relatively dilute, as disclosed in U. S. Patent No. 1,596,590, to De Groote, dated August 17, 1926, and yet, it is different from the reagents disclosed in said De Groote patent and possesses certain valuable additional properties; and it contains a petroleum sulfonic salt or mixture which may be of the kind disclosed in U. S. Patent No. 1,229,385, to Rogers, dated April 1, 1917, but it is distinguished or differentiated from the demulsifying agent disclosed broadly in said Rogers patent by being an oil-soluble petroleum sulfonic acid salt or mixture, regardless of whether it is water-soluble or not. Oil solubility of the petroleum sulfonic acid salt is necessary, whereas, water-solubility is immaterial. An oil-soluble, water-insoluble sulfonic acid salt is most suitable for use in our mixed reagent, even though it is not contemplated in the Rogers patent previously referred to.

In the art of resolving petroleum emulsions of the water-in-oil type the development has been largely along the line of transferring oil-soluble properties to a water-soluble demulsifier. We have found it desirable to decrease the oil-soluble properties of certain demulsifiers, rather than attempt to increase the oil-soluble properties of other water-soluble demulsifiers. For instance, certain petroleum sulfonic acid salts are oil-soluble. Such materials are obtained in the manufacture of white oil, medicinal oil, certain lubricating fractions, and the like. Generally speaking, these oil-soluble petroleum sulfonic acids which remain in the treated oil and do not pass into the acid sludge are referred to as mahogany acids. The art of manufacturing them is well known and is a matter of every-day commercial practice. In some cases these oil-soluble petroleum sulfonic acid salts are relatively ineffective, unless mixed with materials which are very highly water-soluble, especially those which are of recognized value for demulsification, and even then desirable combinations are infrequent and generally admixture results in no definite advantage. In most cases, such mixtures, when added to a petroleum emulsion, act as if each component were added successively or separately, and sometimes the result is decidedly inferior to the action of either component alone. In a vast majority of cases—almost all, as a matter of fact—there is no advantage in the average binary mixture of oil-soluble petroleum sulfonates and most modified fatty acid bodies.

However, we have found that if such oil-soluble petroleum sulfonic acid salts are mixed with certain (not all) modified fatty acid bodies, then the mixture can be given subsequent treatment by combination with other ingredients, so as to change the inherent character of the binary mixture. If such binary mixture of oil-soluble petroleum sulfonates and partially saponified modified fatty acids of a composition to be subsequently defined, are diluted with certain amounts of an oil-soluble hydrophobe vehicle, such as kerosene, tetralin, carbon tetrachloride, lubricating oil, or solvent naphtha, and then diluted further with certain amounts of water-soluble hydrophile vehicles, such as water, or glycerine, or dilute alcohol of 10 to 40% strength, so that the mixture is free-flowing, it can be changed in inherent characteristics by the addition of inorganic salts, so as to produce a very efficient demulsifying agent. More conveniently, at times, a binary mixture of oil-soluble petroleum sulfonates and specified modified fatty acid bodies, is mixed with a second binary mixture of a water-soluble solvent and an oil-soluble solvent, and then contacted with inorganic mineral acid salts so that 1 to 5% of such inorganic mineral acid salts are dissolved and present in the final mixture. The above procedure results in a demulsifying agent of unexpectedly valuable characteristics, due to co-operative action between the component members. Any neutral compatible inorganic salts of mineral inorganic acids, such as sodium sulfate, sodium sulfite, ammonium sulfate, potassium sulfate, sodium chloride, ammonium chloride, etc., may be used. Acidic salts, such as sodium hydrogen sulfate, or reactive salts, such as calcium chloride, are usually objectionable. The mixture constituting the demulsifying agent contemplated by our process is obtained from oil-soluble petroleum sulfonates of the kind previously described. The sulfonates may be in the form of sodium, potassium, or ammonium salts, or in the form of salts derived from hydroxy amines, such as triethanolamine, or amine salts, such as the aniline salts. In a number of cases the magnesium, calcium or aluminum salts may be satisfactory, provided no objectionable reaction takes place in the mixture. The modified fatty acids may be used as such or in the form of a salt, or a salt mixed with an ester or mixed with an acid, or mixed with both an ester and an acid. The expression "modified fatty acid partially saponified" in the claims is intended to include all previous members or mixtures, provided that at least some salt is present. We prefer to use modified fatty acids in the form of a mixture of the modified fatty acid and a salt thereof, particularly a water-soluble ammonium salt, such as a partially saponified fatty acid. Sodium or potassium salts are just as suitable as ammonium salts. Likewise, salts derived from hydroxy amines, such as triethanolamine, are equally suitable. We have not found sulfo-fatty acids to be a desirable type of modified fatty acid, and if they constitute more than one-third of the fatty acid content, they are undesirable. It is not contemplated that the modified fatty acids used in our demulsifying agent consist of sulfo-aromatic fatty acids, or of fatty sulfonic acids, or of fatty acid sulfates. We find modified fatty acids obtained by the hydrolysis of fatty acid sulfates to be most desirable, particularly if heated during or after hydrolysis to about 60° C. We particularly prefer those derived from castor oil, oleic acid, or sperm oil, or mixtures of two or more. Other suitable fatty bodies, such as cod oil or neatsfoot oil, may be used, but are not nearly as desirable. Even though sulfo-fatty acids are not desirable for our process, it is possible to replace one-third of the total amount of modified fatty acids present by a sulfo-fatty acid, without appreciable loss of demulsifying value.

We have found that when mixtures of petroleum sulfonic bodies of the kind described and modified fatty acid bodies of the kind described, are prepared without diluents, although the viscosity of the mixture is not great enough to prevent its use as a demulsifier, if one cares to use it, particularly after solution in water, yet it is so great that the addition of inorganic salts do not have any beneficial effect, even though they may dissolve in such viscous mixture, especially when the mixture is heated. We have also discovered that the addition of an oil-soluble hydrophobe solvent alone, such as kerosene, solvent naphtha, benzol, or carbon tetrachloride, may reduce the viscosity, but apparently prevents the inorganic salts from exerting their beneficial effect in the absence of a disassociating liquid, such as water. We have found that when a moderate quantity of a water-soluble solvent alone, such as water, dilute alcohol, or glycerol is added, that the viscosity is still too high, or else, the inorganic salts are not effective for some other reason. On the other hand, we have found that when a mixture of water-soluble solvents and oil-soluble solvents in approximately equal amounts, or even three or more parts of one to one part of the other are added to the binary petroleum sulfonic fatty material, so that it is free-flowing, that the beneficial effect of the added inorganic salts becomes effective. We wish it to be understood that we do not claim this mixture in the absence of inorganic salts. For convenience, we herein refer to modified fatty acids or salts or esters thereof which are free from, or which contain relatively small amounts of combined sulfur trioxide, as being of the low combined sulfur trioxide type. It is to be understood that the modified fatty acids employed shall not consist of more than one-third of the sulfo fatty acid type and preferably little or no sulfo fatty acid or salt or ester at all.

Our preferred treating agent or demulsifying agent is preferably prepared in the following manner: 30 parts of pure oil-soluble, water-insoluble sodium salt of petroleum sulfonic acid, derived from the manufacture of white medicinal oil or the like and purified so as to be free from appreciable amounts of non-sulfo hydrocarbons, water, and inorganic salts, is mixed by cautious heating with an equal amount of modified fatty acids obtained from castor oil in the manner conventionally employed to produce Turkey red oil. An added proviso is that in the washing or hydrolytic process involved in the manufacture of the modified fatty acid, that the temperature be elevated to about 60° C., and operation continued until the fatty acid sulfates are completely decomposed. To this mixture of the two components, while warm, we add 25 parts of kerosene and two parts of ammonium sulfate dissolved in 15 parts of water or 15 parts of 10% alcohol solution in water, and stir until the mixture is complete. It is then allowed to cool in 30° C. or less. We then carefully add strong ammonia to partially neutralize the modified fatty acids present and to give a mixture which possesses the physical properties described in both the Ayres patent and De Groote patent, previously referred to. As the ammonia is added, the mixture is tested frequently until water-solubility (hydrophile character) is obtained. Also the mixture must be soluble or miscible in kerosene or crude oil (hydrophobe character) in a 25 to 50% solution, and must settle out in a 1 to 5% concentration. When sufficient ammonia has been added to produce these characteristics, no further addition is made, unless tests show that further addition increases other desirable properties, such as demulsifying properties, without disturbing these solubilities. No special or particular procedure is required to combine the substances or ingredients above mentioned, so as to produce a homogeneous mixture, as analogous homogeneous mixtures of water-soluble petroleum sulfonic acid salts and fatty acids, and procedure for producing such mixture is well known and is disclosed in French Patent No. 452,054, of 1913, to Petroff.

We will now point out more specifically the compositional limits within which our improved mixtures must fall, in order to obtain the benefits heretofore mentioned. The limitations are substantially as follows: Oil-soluble petroleum sulfonates 13 to 60 parts. Low sulfur trioxide type modified fatty acid body 13 to 61 parts. Hydrophobe solvent, such as kerosene, 4 to 30 parts. Hydrophile solvents, such as water, 4 to 30 parts. Inorganic salts, such as ammonium sulphate, 1 to 5 parts, selected to total 100 parts. It is less confusing if our improved demulsifying agent be considered as consisting of three components, instead of five, and if two of the three components be considered as binary mixtures. From this angle, the mixture may be said to contain from 40 to 78 parts of petroleum sufonates and modified fatty acid bodies mixture, 19 to 55 parts of the oil-soluble and water-soluble solvents mixture, and 1 to 5 parts of the inorganic salts selected to total 100 parts. In the petroleum sulfonate modified fatty acid mixture, one component should not be present in more than four times the amount of the other. In other words, the ratio of the two members of the binary mixture should be within the limits of 1 to 4 or 4 to 1. Likewise, the hydrophile and hydrophobe solvents should not be present in a ratio where one solvent is more than five times the other solvent. In other words, the ratio of these two solvents to each other should remain within the limits of 1 to 5 or 5 to 1.

In order to more clearly define the compositional limits of our improved mixture, we refer to the accompanying drawing, which depicts a conventional triaxial chart of the kind universally used to indicate to components of a three member system. In the said drawing the point A represents 100% of solvent mixture of the kind previously defined. The point Z, directly opposite A, represents 0% of such solvents. The point B represents 100% of inorganic salts, whereas, the point M, directly opposite B, represents 0% of inorganic salts. The point C represents 100% of the mixture of modified fatty acids and oil-soluble petroleum sulfonates within the limits previously described, whereas, the point O, directly opposite C, represents 0% of modified fatty acids petroleum sulfonate mixture. The line AB represents mixtures of inorganic salts and solvents only. The line AC represents mixtures of solvents, and the modified fatty acid petroleum sulfonate component only. The line BC represents mixtures of the inorganic salts and the modified fatty acid petroleum sulfonate component only. The area within the triangle ABC represents all the various mixtures which might be obtained, whereas, the particular area which we will now define designates the compositional limits of the mixtures which we contemplate for our demulsifying agent. A point representing one percent inorganic salts is designated on the line BM. The broken line $A^1C^1$ is drawn through the said one percent point parallel to the line AC. A second point on the line BM, equivalent to 5% inorganic salts, is designated, and a second broken line $A^2C^2$, parallel to AC, is drawn through the said second point on the line BM. These two broken lines $A^1C^1$ and $A^2C^2$ limit mixtures containing 1 to 5% inorganic salts, regardless of what else they may contain.

A point on the line OC is selected which corresponds to 40% of modified fatty acid petroleum sulfonate mixture, and the line $A^3B^1$ is drawn, parallel to AB, and also line $A^4B^2$ thru the 78% point, thus limiting the area of 40 to 78% petroleum sulfonate modified fatty acid mixture, regardless of what the remainder of the mixture may be. In a similar manner, the line $B^3C^3$ and the line $B^4C^4$ are drawn parallel to BC, so as to limit those mixtures containing from 19 to 55% solvent without regard as to the other components of the mixture.

The black area of the chart which is a relatively limited area compared with the chart as a whole, indicates the area which is common to the three limiting zones previously made by means of the parallel lines. This black area clearly specifies the limits of composition of the mixture which constitutes our improved demulsifying agent. It is to be understood that the further limitation has already been expressed that the binary mixtures, that is, modified fatty acids and petroleum sulfonates, be of the kind within the mathematical limits described previously. Likewise, the mixture of solvents must come within the limits described. Thus, our contemplated demulsifying agent does not even include mixtures of this black area broadly, but only includes them, provided that they meet the additional requirements outlined and also possess the solubility factors and emulsifying tendency of the Ayres patent and also the character of the DeGroote patent previously referred to.

Our improved demulsifying agent has gone into extensive commercial use and large quantities of same have been sold to the major oil companies for use in the central Oklahoma oil field. It has been used commercially in the form of a number of different compounds, five of which are of the following composition:

|  | Compounds | | | | |
| --- | --- | --- | --- | --- | --- |
|  | A | B | C | D | E |
| Modified fatty acids partially or totally saponified with ammonia | 39.0 | 61.0 | 35.0 | 53.0 | 48.0 |
| Oil-soluble sodium petroleum sulfonate | 31.0 | 16.0 | 23.0 | 13.0 | 15.0 |
| Hydrophile solvent, water, dilute alcohol, etc. | 20.0 | 17.0 | 18.0 | 17.5 | 10.0 |
| Hydrophobe solvent, kerosene, lubricating oil fraction, solvent naphtha, cresol, etc. | 8.5 | 4.0 | 22.5 | 15.5 | 25.0 |
| Inorganic sulfate, sodium sulfate, sodium sulfite, ammonium sulfite | 1.5 | 2.0 | 1.5 | 1.0 | 2.0 |

We wish it to be understood that in manufacturing or producing our improved demulsifying agent, oleic acid or sperm oil are substantially as satisfactory as castor oil for producing the modified fatty acids, although we prefer that castor oil be the source of the modified fatty acid bodies.

The petroleum sulfo-acid salt mixtures contemplated by our invention are not the water-soluble acid sludge type, of the kind specifically described in the Rogers patent, but are oil-soluble petroleum sulfo-acid salts or mixtures. As previously stated, these oil-soluble sulfo-acid or mixtures may or may not both be water-soluble. Where we herein refer to petroleum sulfonic acid salts, we include mixtures, i. e., the salts of a number of petroleum sulfonic acids which may vary somewhat in molecular weight or solubility properties. It is not to be understood that our invention is limited to a salt of a single specific petroleum sulfonic acid, as distinguished from mixtures of two or more.

Moreover, we wish it to be understood that the final mixture which constitutes our reagent may be made in any convenient manner, for instance, the oil-soluble solvent may be added to the petroleum sulfonate and the water-soluble solvent may be added to the modified fatty acid salt. The inorganic salts may be dissolved in the water, or may be added to the mixture when all other ingredients are added, or may be added as a component of the modified fatty acids, or in any convenient manner. All that is required is, that the final mixture correspond in kind and in properties to the compositional limits previously specified, and the actual mixture may be made in any manner desired.

In practising our process, the treating agent or demulsifying agent, preferably in undiluted form, for the reasons previously stated, may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constitutents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of 1 part of treating agent to 5,000 parts of emulsion will usually be found to produce commercially satisfactory results.

In the claims, we have used the expression "within the compositional limits herein described" to indicate that the mixtures contemplated by our process, fall within the mathematical limits of the black area in the triaxial chart. As previously explained, our invention contemplates mixtures derived from the class of modified fatty acids and petroleum sulfonates described, provided that the mixture is of the kind defined by the mathematical limits described previously. Likewise, the mixture of solvents must be of the kind characterized by the mathematical limits described previously.

Having thus described our invention, what we claim as new and desire to secure by Letters Patent is:

1. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sulfonate and 13 to 61 parts of a partially saponified, modified fatty acid body of which at least two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

2. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sodium sulfonate and 13 to 61 parts of a partially saponified, modified fatty acid body of which at least two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

3. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sodium sulfonate and 13 to 61 parts of a modified fatty acid body of which at least two thirds is of the non-sulfo type, the said fatty body being partially saponified with ammonium hydroxide, and the ratio between the petroleum sulfonate and the fatty body being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

4. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sodium sulfonate and 13 to 61 parts of a modified fatty acid body of which at least two thirds is of the non-sulfo type, the said fatty body being partially saponified with ammonium hydroxide, and the ratio between the petroleum sulfonate and the fatty body being within the limits of 4 to 1 and 1 to 4; (B) 4 to 30 parts of a dilute alcohol solution and 4 to 30 parts of a hydrophobe solvent, in a ratio within the limits of 5 to 1 and 1 to 5; (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

5. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sodium sulfonate and 13 to 61 parts of a modified fatty acid body of which at least two thirds is of the non-sulfo type, the said fatty body being partially saponified with ammonium hydroxide, and the ratio between the petroleum sulfonate and the fatty body being within the limits of 4 to 1 and 1 to 4; (B) 4 to 30 parts of a dilute alcohol solution and 4 to 30 parts of kerosene, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

6. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sodium sulfonate and 13 to 61 parts of a modified fatty acid body of which at least two thirds is of the non-sulfo type, the said fatty body being partially saponified with ammonium hydroxide, and the ratio between the petroleum sulfonate and the fatty body being within the limits of 4 to 1 and 1 to 4; (B) 4 to 30 parts of a dilute alcohol solution and 4 to 30 parts of kerosene, in a ratio within the limits of 5 to 1 and 1 to 5; and (C) 1 to 5 parts of ammonium sulfate, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

7. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

8. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sodium sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

9. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sodium sulfonate and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

10. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sodium sulfonate and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of a dilute alcohol solution and 4 to 30 parts of a hydrophobe solvent, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

11. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sodium sulfonate and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of a dilute alcohol solution and 4 to 30 parts of kerosene, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as to 1 to 5%, and moreover, has hydrophile properties when added to water, whereby it tends to form an oil-in-water emulsion.

12. A process for breaking petroleum emulsions of the water-in-oil type, characterized by subjecting the emulsion to the action of a demulsifying agent consisting of a free flowing mixture comprising the following components: (A) 13 to 60 parts of an oil-soluble, water-insoluble petroleum sodium sulfonate and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of a dilute alcohol solution and 4 to 30 parts of kerosene, in a ratio within the limits of 5 to 1 and 1 to 5, and (C) 1 to 5 parts of ammonium sulfate, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

13. A process for breaking petroleum emulsions of the water-in-oil type, characterized by subjecting the emulsion to the action of a demulsifying agent consisting of a free flowing mixture comprising the following components: (A) 13 to 60 parts of an oil-soluble petroleum sulfonate and 13 to 61 parts of partially saponified, modified fatty acid derived from castor oil, at least two thirds of said fatty acid being of the non-sulfo type and the ratio between the petroleum sulfonate and the fatty acid being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

14. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 61 parts of an oil-soluble petroleum sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the l'mits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

15. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sodium sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of a hydrophile solvent and 4 to 30 parts of a hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

16. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sodium sulfonate, and 13 to 61 parts of a modified fatty acid of which at least two thirds is of the non-sulfo type, said modified acid being partially saponified with ammonium hydroxide and the ratio between the petroleum sulfonate and the fatty body being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

17. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sodium sulfonate, and 13 to 61 parts of a modified fatty acid of which at least two thirds is of the non-sulfo type, said modified acid being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of hydrophobe solvent, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

18. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sodium sulfonate, and 13 to 61 parts of a modified fatty acid of which at least two thirds is of the non-sulfo type, said modified fatty acid being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of kerosene, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

19. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sodium sulfonate, and 13 to 61 parts of a modified fatty acid of which at least two thirds is of the non-sulfo type, said modified acid being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of kerosene, in a ratio within the limits of 5 to 1 and 1 to 5; and (C) 1 to 5 parts of ammonium sulfate, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

20. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble, water-insoluble petroleum sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

21. A process for breaking petroleum emulsions of the water-in-oil type, characterized by subjecting the emulsion to the action of a demulsifying agent in the absence of aqueous dilution prior to use, and said demulsifying agent consisting of a free flowing mixture comprising the following components: (A) 13 to 60 parts of an oil-soluble, water-insoluble petroleum sodium sulfonate and 13 to 61 parts of a partially saponified, modified fatty acid body of which two thirds is of the non-sulfo type, the ratio between the petroleum sulfonate and the fatty body being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

22. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble, water-insoluble petroleum sodium sulfonate, and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of hydrophile solvent and 4 to 30 parts of hydrophobe solvent in a ratio within the limits of 5 to 1 and 1 to 5; and (C) 1 to 5 parts of neutral compatible inorganic salts of mineral acids; selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

23. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble, water-insoluble petroleum sodium sulfonate, and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of hydrophobe solvent, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

24. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble, water-insoluble petroleum sodium sulfonate, and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of kerosene, in a ratio within the limits of 5 to 1 and 1 to 5; and (C) 1 to 5 parts of neutral compatible inorganic salts of mineral acids, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

25. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble, water-insoluble petroleum sodium sulfonate, and 13 to 61 parts of a modified fatty acid body of which at least two thirds is of the non-sulfo type, said fatty body being partially saponified with ammonium hydroxide and the ratio between the petroleum sulfonate and the fatty body being within the limits of 4 to 1 and 1 to 4; (B) 4 to 30 parts of dilute alcohol solution and 4 to 30 parts of kerosene, in a ratio within the limits of 5 to 1 and 1 to 5; and (C) 1 to 5 parts of ammonium sulfate, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

26. A process for breaking petroleum emulsions of the water-in-oil type, characterized by subjecting the emulsion to the action of a demulsifying agent in the absence of aqueous dilution prior to use, the said demulsifying agent consisting of a free flowing mixture comprising the following components: (A) 13 to 60 parts of an oil-soluble petroleum sulfonate and 13 to 61 parts of a partially saponified, modified fatty acid body of which at least two thirds is of the non-sulfo type, the said fatty acid body being derived from castor oil and the ratio between the petroleum sulfonate and the fatty body being within the limits of 4 to 1 and 1 to 4; (B) 4 to 30 parts of dilute alcohol solution and 4 to 30 parts of kerosene, in a ratio within the limits of 5 to 1 and 1 to 5; and (C) 1 to 5 parts of ammonium sulfate, selected to total 100 parts, the said mixture being further characterized by the fact that it is oil-soluble in high concentrations in kerosene, such as 25 to 50%, and separates from kerosene in dilute concentrations, such as 1 to 5%, and moreover, has hydrophile properties when added to water, whereby it tends to form an oil-in-water emulsion.

MELVIN DE GROOTE.
ARTHUR F. WIRTEL.